United States Patent [19]

Blanz

[11] 3,941,432

[45] Mar. 2, 1976

[54] CHANGE-OVER VALVE FOR TWO-LINE TRAILER BRAKE SYSTEMS WITH AT LEAST ONE BRAKE CIRCUIT

[75] Inventor: Roland Blanz, Heidelberg, Germany

[73] Assignee: Graubremse GmbH, Heidelberg, Germany

[22] Filed: Aug. 21, 1974

[21] Appl. No.: 499,420

[30] Foreign Application Priority Data

Aug. 23, 1973 Germany ............................ 7330765

[52] U.S. Cl......................... 303/52; 303/6 R; 303/68

[51] Int. Cl.[2] ........................................... B60T 15/06

[58] Field of Search............ 303/7, 8, 9, 13, 50, 52, 303/71, 68, 40, 6 R; 188/152, 359

[56] References Cited

UNITED STATES PATENTS

| | | | |
|---|---|---|---|
| 3,228,730 | 1/1966 | Schubert | 303/7 |
| 3,304,131 | 2/1967 | Bueler | 303/13 |
| 3,695,731 | 10/1972 | England et al. | 303/7 |
| 3,718,372 | 2/1973 | Gruner et al. | 303/7 |
| 3,820,854 | 6/1974 | Stearns | 303/71 X |

*Primary Examiner*—Trygve M. Blix
*Assistant Examiner*—Douglas C. Butler
*Attorney, Agent, or Firm*—Ronald I. Griffin

[57] ABSTRACT

A change-over valve including a housing and a slide sealingly guided therein is provided for use with a two-line trailer brake system having two brake circuits. The slide is retained in a normal position, at which supply tubes leading to compressed air supply tanks for the brake circuits are closed, by a piston loaded with compressed air from a supply tube, but is manually movable to a maneuvering position, at which the brakes of the system are released. The slide is provided with two channels and two associated check valves arranged so that when the slide is in the normal position it closes the supply tubes leading to the compressed air supply tanks for the brake circuits and so that when the slide is in the maneuvering position it connects those supply tubes via its channels and the associated check valves to a common space, which is connected to one or more emergency brake chambers for emergency brake pistons of the trailer brake system.

8 Claims, 2 Drawing Figures

16 26 25 31 33 17 27 29 13 18 37 8 19 15 24 21 20 1 22 23 3 6 7 28 30 12 11 10 4 14 9 37 32 34 2 5

16
26
25
31
33
17
27
29
13
18
37
8
19
15
24
21
20
1
22
23
3
6
7
11
12
10
4
28
30
37
14
9
32
34
2
5

16
13
18
1
17
35
36
CHECK VALVE
15
4
14
25
26
31
33
34
32
2
29
30
27
28

CHANGE-OVER VALVE FOR TWO-LINE TRAILER BRAKE SYSTEMS WITH AT LEAST ONE BRAKE CIRCUIT

BACKGROUND OF THE INVENTION

This invention relates generally to trailer brake systems. More specifically, this invention relates to a change-over valve for a two-line trailer brake system with at least one brake circuit. Such a change-over valve includes a housing and a slide sealingly guided therein, the slide being moved into a normal position wherein a supply tube leading to a compressed air supply tank for the brake circuit is closed and being detained in the normal position by a piston loaded with compressed air from another supply tube. The slide is manually slideable into a maneuvering position wherein the brakes of the two-line trailer brake system are released.

Such a change-over valve is shown and described in published German patent application Ser. No. DT-OS 2 135 924, which also discloses a two-line, two-circuit trailer brake system with two separate brake valves. One of these two brake valves is operatively connected via this change-over valve with spring-loaded brake cylinders provided in one brake circuit only. Upon the connection and flow of compressed air through the supply tube of the trailer brake system, a slide of the change-over valve is moved into the normal position and detained there by a piston arranged on the slide, unless, of course, the slide was already in the normal position. On decoupling of the trailer, the spring loaded brakes are actuated in the usual way. For maneuvering purposes the slide of the change-over valve can be moved manually into the maneuvering position wherein the supply tube of the trailer brake system is disconnected and a cylinder of the spring-loaded brakes is charged with compressed air from the supply tank of one of the brake circuits.

In published German patent application Ser. No. DT-OS 2 152 996 two brake valves for a two-circuit trailer brake system are shown and described. These brake valves are only mounted together and otherwise have two emergency brake pistons that cause lock braking of the trailer on its decoupling in the usual way. In published German patent application Ser. No. DT-OS 2 148 572 there is shown a single trailer brake valve formed as a two-circuit device. One of the two brake circuits has an emergency brake piston, which acts only on one brake circuit. In published German Patent Application DT-OS 2 158 229 there is shown a similarly constructed two-circuit trailer brake valve with a single emergency brake piston which, however, acts on both brake circuits.

SUMMARY OF THE INVENTION

It is the principal object of this invention to provide an improved change-over valve of the kind mentioned at the beginning that may be used in a two-circuit trailer brake system with at least one emergency brake piston to release the wheel-brakes via the supply connection from two separate compressed air supply tanks for the two brake circuits without an actual connection between the two supply tanks. Furthermore, the change-over valve must in any case return to its normal position or be detained in it on coupling of the trailer to the driving vehicle in preparation for when the supply tube of the trailer brake system is next vented.

This object is accomplished according to the preferred embodiment of this invention by providing the slide of a change-over valve for use in a two-circuit trailer brake system with two channels and two associated check valves arranged so that when the slide is in a normal position it closes the supply tubes leading to the compressed air supply tanks for the two brake circuits and so that when the slide is in a maneuvering position it connects those supply tubes via its channels and the associated check valves to a common space, which is connectable to one or more emergency brake chambers for emergency brake pistons of the trailer brake system.

This change-over valve can be utilized advantageously in any of the braking systems mentioned above. If necessary, it can also be employed in a one-circuit trailer brake system, provided one of the two channels in the slide of the change-over valve is shut off.

In the housing of the change-over valve a connection for the supply tube of the trailer brake system is provided and coupled to another connection for a supply tube leading via at least one brake valve of the trailer brake system to the compressed air supply tanks. A gate valve arranged between these connections is opened in the normal position and closed in the maneuvering position.

The gate valve is preferably formed by a protruding edge of the housing of the change-over valve and by an adjacent valve plate that encircles the slide of the change-over valve, is sealingly guided by a slide, and rests upon a spring mounted on a piston formed as part of the slide. It is essential that the gate valve be opened in the normal position so that the pressure decrease in the supply tube of the trailer brake system upon decoupling of the trailer may effect lock braking of the trailer.

The valve plate is disposed on one side of the piston of the slide and in a control chamber formed in the housing of the change-over valve, the common space into which the two channels of the slide open being arranged on the other side of the piston. Stops limit the maximum travel of the valve plate on departing from the piston such that the gate valve is opened only when the piston is loaded with compressed air in the control chamber.

The piston of the slide has an annular collar that releases only the overflow from the common space through the control chamber and acts therefore as a check valve in one direction. It is obvious to one skilled in the art that the common space may also be connected with the control chamber by a by-pass line, which in this case would have to be provided with the check valve.

The two channels of the slide open into the common space adjacent to one side of the slide. A bellows of resilient material surrounds the slide and covers the openings of these two channels into the common space to form two check valves therefor.

The change-over valve can be manufactured and mounted as a single valve. It is possible, however, to combine it structurally with a trailer brake valve intended for use with a two-circuit trailer brake system, resulting in correspondingly short tube connections.

The invention may be modified and used in many different ways. It will be more apparent from the following description of exemplary preferred embodiments which should be read in conjunction with the accompanying drawings.

DESCRIPTION OF PREFERRED EMBODIMENTS

Figure 1:
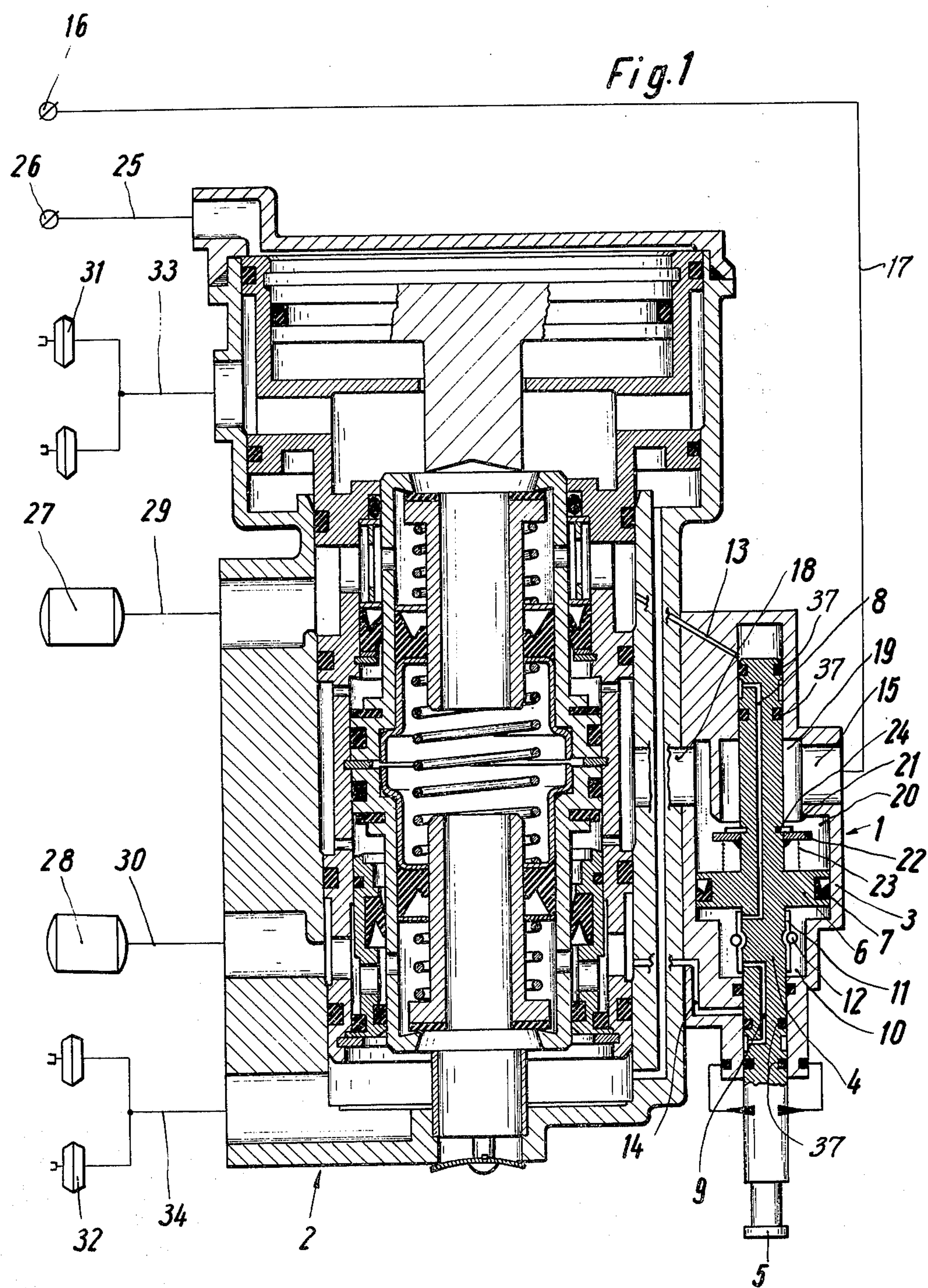
FIG. 1 is a cross sectional side view of a change-over valve as a component of a two-circuit trailer brake valve.

Referring now to FIG. 1, a change-over valve 1 constructed in accordance with one of the preferred embodiments of this invention is mounted on a two-circuit trailer brake valve 2 or disposed in a housing thereof. Change-over valve 1 includes a housing 3, in which a slide 4 is guided as shown in a sealing manner. Slide 4 is adapted to occupy one of two positions within housing 3, a normal position as shown in FIG. 1 and a maneuvering position into which slide 4 may be raised by manually acting on its end 5 protruding from housing 3.

Slide 4 has a piston 6, the piston packing of which is formed as a generally V-shaped annular collar 7 as shown to permit overflow only in one direction. Annular collar 7 therefore acts as a check valve. Slide 4 furthermore has a channel 8 for a first brake circuit and a channel 9 for a second brake circuit. Channels 8 and 9 each open at one end into a common space 10 within housing 3. In the vicinity of these openings channels 8 and 9 are covered by a bellows 11 of resilient material surrounding slide 4 and immovably held thereon by a spring 12. Bellows 11 thus forms two check valves for channels 8 and 9, respectively. It is obvious to one skilled in the art that instead of bellows 11 conventional check valves may also be provided either in channels 8 and 9 or in the course of supply tubes leading to these two channels.

In housing 3 a connection 13 is provided for connecting a supply tube to a compressed air supply tank 27 for one of the two brake circuits of the illustrated brake valve 2. Similarly, a further connection 14 provided in housing 3 is for connecting a supply tube to a compressed air supply tank 28 for the other of the two brake circuits of the illustrated brake valve 2. The openings of connections 13 and 14 to the cylindrical space for slide 4 in housing 3, the openings at the other ends of channels 8 and 9 (i.e., the ends remote from common space 10), and the slide packings 37 on opposite sides of those openings are positioned such that connections 13 and 14 are closed in the normal position of slide 4, as shown in FIG. 1, but communicate with channels 8 and 9, respectively, in the raised maneuvering position of slide 4.

Furthermore, housing 3 of change-over valve 1 has a connection 15, which is connected to a supply tube 17 from a coupling head 16. A still further connection 18 on housing 3 of change-over valve 1 serves to connect change-over valve 1 with one or both brake circuits of the brake valve 2 via supply tube over which the brake circuits of brake valve 2 are fed with compressed air (if they are provided with an integrated pressure safety mechanism, and the supply tanks for both brake circuits of the brake valve 2 are thus connected to those brake circuits). Connection 15 enlarges to form an annular space 19 and a control chamber 20 on the side of piston 6 facing away from common space 10. Between annular space 19 and control chamber 20 there is provided a gate valve 21–22, which consists of a downwardly projecting edge 21 of housing 3 and an adjacent valve plate 22. Valve plate 22 is sealingly guided on slide 4 and rests over a spring 23 mounted on piston 6 around slide 4. The maximum allowable travel of valve plate 22 away from piston 6 is limited by stops 24 so as to keep gate valve 21–22 open in the illustrated normal position of slide 4. In the raised maneuvering position of slide 4, valve plate 22 is resiliently urged into abutment upon the edge 21 of housing 3 so that gate valve 21–22 acts as a check valve.

The two-circuit trailer brake valve 2 has been chosen only to illustrate a possible application of change-over valve 1. Since the trailer brake valve 2 is constructed for two-circuit trailer braking it has two control pistons, at least one of which is loaded with compressed air via a supply tube 25 and a coupling head 26. The other control piston is provided with an air pressure safety mechanism, the operation of which corresponds to that of multicircuit safety valves used for the air supply tanks of both brake circuits in conventional two-circuit brake systems. For this reason two compressed air supply tanks 27 and 28 for the two brake circuits of brake valve 2 are connected with two corresponding connections of trailer brake valve 2 over tubes 29 and 30, respectively. Brake cylinder 31 for one of the brake circuits of trailer brake valve 2 and brake cylinder 32 for the other of the brake circuits of trailer brake valve 2 are also connected with two corresponding connections of trailer brake valve 2 via tubes 33 and 34, respectively. It is essential for the application of change-over valve 1 in connection with trailer brake valve 2 that the latter be an emergency brake device. In the illustrated trailer brake valve 2 the air pressure protection piston also serves at the same time as an emergency brake piston. The emergency brake pistons of trailer brake valve 2 serve to accomplish a braking of the trailer by applying air pressure from air supply tanks 27 and 28 to brake cylinders 31 and 32 for the two brake circuits of brake valve 2 when the trailer is decoupled and supply tube 17 is thereby vented. The resulting lock braking of the trailer has to be released for maneuvering purposes. This is accomplished by means of change-over valve 1 as described below.

Slide 4 of change-over valve 1 is moved manually into the raised maneuvering position by acting on the protruding end 5 thereof. In doing so connections 13 and 14, which were previously closed, are respectively connected to channels 8 and 9 of slide 4. Since connections 13 and 14 directly communicate with compressed air supply tanks 27 and 28, the air supply in these tanks may discharge via bellows 11 into common space 10 and from there may overflow annular collar 7 into control chamber 20. During the movement of slide 4 from the illustrated normal position to the raised maneuvering position gate valve 21–22 is also closed by bringing valve plate 22 into contact with the edge 21 of housing 3. Valve plate 22 is pressed into this position by the action of spring 23 to preclude a back flow of air into supply tube 17. Air flowing into control chamber 20 via annular collar 7 from supply tanks 27 and 28 therefore reaches only connection 18 of housing 3 and from there the emergency brake chambers of the two emergency brake pistons. This controls the emergency brake pistons of trailer brake valve 2 to close its inlet valves and to open its outlet valves so that brake cylinders 31 and 32 are vented. In this position the brakes are released and the trailer can be handled. For again lock braking the trailer it is only necessary to move slide 4 of change-over valve 1 back into its illustrated normal position so that control chamber 20 which communicates with connection 18, can be vented via supply tube 17 and the emergency brake pistons of trailer brake valve 2 can again initiate braking action in brake cylinders 31 and 32.

However, if moving the slide 4 of change-over valve 1 back into its illustrated normal position is forgotten after a handling of the trailer, the lock braking operation described above will occur automatically on coupling of the trailer to the driving vehicle in preparation for the next venting of the supply tube 17 via coupling head 16. Supply air for this purpose flows via connection 15, annular space 19, and the opening gate valve 21–22 into control chamber 20 to load piston 6. An overflow of this air along piston 6 is prevented by the form and arrangement of annular collar 7 so that a corresponding pressure may build up in control chamber 20 and eventually move slide 4 automatically back into its normal position and retain it there.

Figure 2:
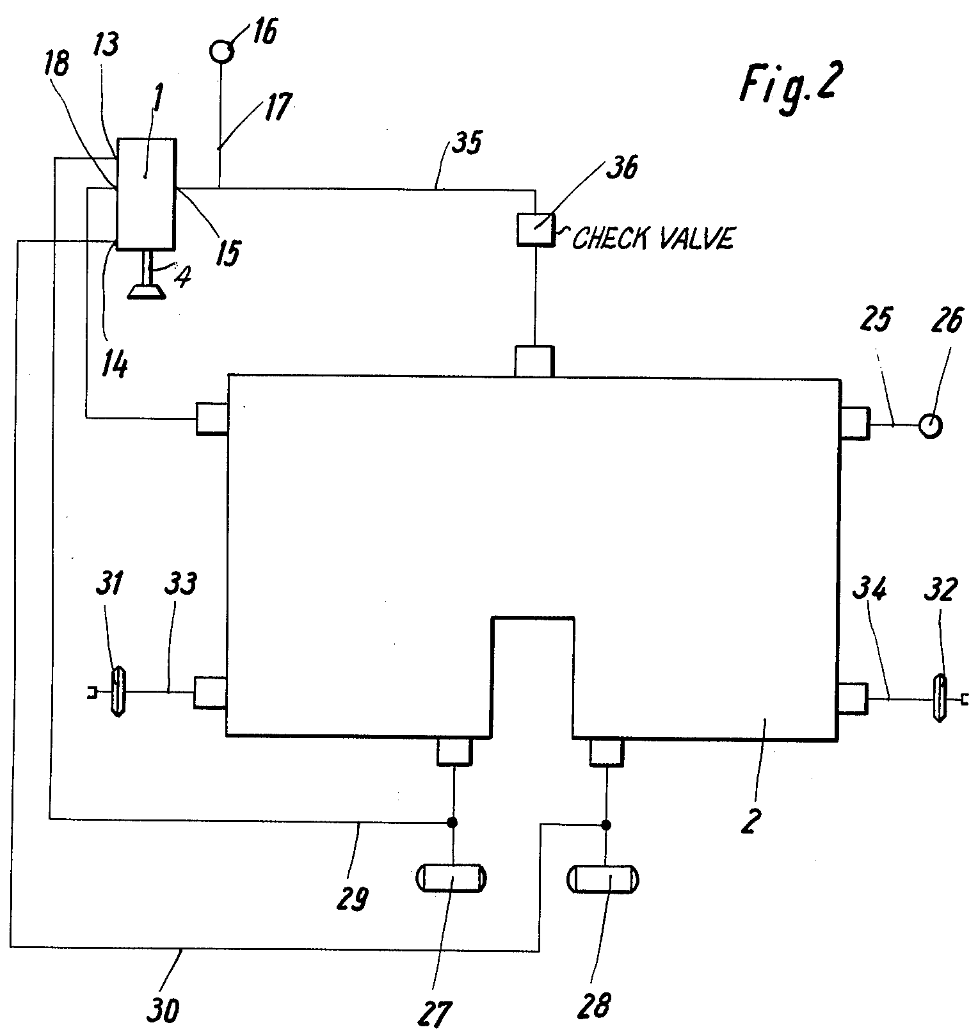
FIG. 2 is a schematic representation of a two-circuit trailer brake system including the change-over valve.

In FIG. 2 a further possible application of change-over valve 1 is illustrated wherein the trailer brake valve 2 may be formed, for example, as shown and described in published German Patent Application DT-OS 2 152 996 mentioned above. In this embodiment the emergency brake pistons are loaded on both sides with compressed air furnished by supply tube 17. while air is supplied to only one side of the emergency brake pistons via change-over valve 1, the other side of the emergency brake pistons is connected to a tube 35 branching off from supply tube 17 and provided with a check valve 36. In this case the emergency brake pistons also cause a lock braking of the trailer if supply tube 17 is vented. By means of check valve 36 the air supply on one side of the emergency brake pistons is maintained so that the emergency brake pistons may cause a corresponding movement and thus a closing of the outlet valves as well as an opening of the inlet valves of both structurally combined brake circuits of trailer brake valve 2. Also in this case the air supply stored in supply tanks 27 and 28 for the two brake circuits of trailer brake valve 2 may be directed by means of change-over valve 1, when its slide 4 is in the maneuvering position, via tubes 29 and 30 and connection 18 to the trailer brake valve 2 or to the other side of both emergency brake pistons thereof so that the brakes may be lifted.

Change-over valve 1 may be used together with any two-circuit trailer brake valve. It is advisable to structurally combine change-over valve 1 and trailer brake valve 2 if possible, in order to obtain short connections.

I claim:

1. A change-over valve for use with a trailer brake system having two brake circuits and at least one emergency brake chamber, said change-over valve comprising:

a housing having first and second ports for connection to compressed fluid supply tanks for both brake circuits of the trailer brake system and having a third port for connection to at least one emergency brake chamber of the trailer brake system;

a slide sealingly guided within said housing for movement between a first position and a second position;

a piston guided within said housing and coupled to said slide for movement together therewith;

a fourth port formed in said housing for supplying compressed fluid to said piston to move said slide to said first position;

a common space formed within said housing and coupled to said third port;

means for manually moving said slide to said second position; and two channels formed in said slide and positioned so that said slide connects the first and second ports to the third port via said channels, said common space, and a check valve when said slide is moved to the second position and disconnects the first and second ports from the third port when said slide is moved to the first position.

2. A change-over valve as in claim 1 including a gate valve positioned between said third and fourth ports and disposed for being opened when said slide is moved to said first position and closed when said slide is moved to said second position.

3. A change-over valve as in claim 2 wherein said gate valve comprises:

a protruding edge of said housing; and a valve plate encircling said slide, sealingly guided by said slide, and supported by a spring.

4. A change-over valve as in claim 3 wherein:

said piston is sealingly guided within a chamber formed within said housing, coupled to said third port, and coupled to said fourth port via said gate valve;

said spring and said valve plate supported thereon are positioned within said chamber, on one side of said piston, and adjacent to said protruding edge of said housing; and said common space is positioned adjacent to said chamber and on the other side of said piston.

5. A change-over valve as in claim 4 wherein said piston includes an annular collar forming a check valve that permits overflow only from said common space to said chamber.

6. A change-over valve as in claim 5 wherein:

each of said channels formed in said slide has an opening at one end thereof into said common space; and said change-over valve includes a bellows of resilient material encircling said slide and covering said openings to form a check valve for each of said channels.

7. A change-over valve as in claim 1 structurally combined with a brake valve of the trailer brake system.

8. A change-over valve as in claim 1 wherein:

each of said channels formed in said slide has an opening at one end thereof into said common space; and said change-over valve includes a bellows of resilient material encircling said slide and covering said openings to form a check valve for each of said channels.

* * * * *